(12) United States Patent
Rydberg et al.

(10) Patent No.: US 7,223,074 B2
(45) Date of Patent: May 29, 2007

(54) PROPELLER SHAFT ARRANGEMENT, PROPELLER ARRANGEMENT, ADAPTIVE ARRANGEMENT AND PROPULSION ARRANGEMENT

(75) Inventors: Anders Rydberg, Arboga (SE); Stefan Nilsson, Koping (SE)

(73) Assignee: AB Volvo Penta, Gothenburg (SE)

( * ) Notice: Subject to any disclaimer, the term of this patent is extended or adjusted under 35 U.S.C. 154(b) by 0 days.

(21) Appl. No.: 10/711,146

(22) Filed: Aug. 27, 2004

(65) Prior Publication Data

US 2005/0002788 A1    Jan. 6, 2005

Related U.S. Application Data

(63) Continuation of application No. PCT/SE03/00335, filed on Feb. 27, 2003, now abandoned.

(30) Foreign Application Priority Data

Feb. 27, 2002    (SE)    .................... 0200581

(51) Int. Cl.
*B63H 23/34*    (2006.01)

(52) U.S. Cl. .............. 416/170 R; 416/244 B; 416/198 R

(58) Field of Classification Search ........... 416/170 R, 416/201 R, 201 A, 245 A, 244 B, 128, 198 R; 403/359.1, 359.5, 359.6
See application file for complete search history.

(56) References Cited

U.S. PATENT DOCUMENTS

| | | | | |
|---|---|---|---|---|
| 1,381,805 A | * | 6/1921 | Crewdson | ................ 403/359.1 |
| 1,803,995 A | * | 5/1931 | Chilton | ................ 403/359.6 |
| 2,297,390 A | * | 9/1942 | Burger | ................ 403/350 |
| 3,132,731 A | * | 5/1964 | Shipley | ................ 192/69.91 |
| 3,222,772 A | | 12/1965 | Leyner | |
| 3,742,656 A | | 7/1973 | Amos | |
| 4,292,001 A | | 9/1981 | Snell | |
| 4,395,247 A | | 7/1983 | Roberts | |
| 4,498,874 A | * | 2/1985 | Pichl | ................ 440/83 |
| 6,604,885 B1 | * | 8/2003 | Neuner | ................ 403/359.2 |
| 2003/0139102 A1 | | 7/2003 | Florander et al. | |

FOREIGN PATENT DOCUMENTS

| | | |
|---|---|---|
| DE | 2601133 A1 | 7/1977 |
| DE | 20012872 U1 | 2/2001 |
| JP | 63297720 A | 12/1988 |
| WO | WO 01/21994 A2 | 3/2001 |

* cited by examiner

Primary Examiner—Ninh H. Nguyen
(74) Attorney, Agent, or Firm—Novak Druce & Quigg, LLP

(57) ABSTRACT

Apparatus for adapting a propeller system including a propeller shaft (15, 16) and a propeller (7, 8) adapted to be mounted on the propeller shaft (15, 16). The propeller system includes a propeller (7, 8) connected in a rotationally fixed manner to a propeller shaft (15, 16), the propeller shaft (15, 16) having a portion provided with splines (19, 20) which cooperate with corresponding splines (25, 28) inside the hub (23, 26) of the propeller (7, 8) in order to obtain the rotationally fixed connection, where the splines (19, 20) on the propeller shaft (15, 16) and in the hub (23, 26) of the propeller (7, 8) are helical, with a predetermined oblique angle ($\alpha$, $\beta$). The invention also relates to a propeller shaft (15, 16) and a propeller (7, 8) which are intended to be used in the propeller system.

11 Claims, 5 Drawing Sheets

PROPELLER SHAFT ARRANGEMENT, PROPELLER ARRANGEMENT, ADAPTIVE ARRANGEMENT AND PROPULSION ARRANGEMENT

CROSS-REFERENCE TO RELATED APPLICATIONS

The present application is a continuation patent application of International Application No. PCT/SE03/00335 filed 27 Feb. 2003 now abandoned which was published in English pursuant to Article 21 (2) of the Patent Cooperation Treaty, and which claims priority to Swedish Application No. 0200581-7 filed 27 Feb. 2002. Said applications are expressly incorporated herein by reference in their entireties.

TECHNICAL FIELD

The present invention relates to a propeller shaft adapted to be connected to the output shaft of a drive motor, the propeller shaft having a portion provided with splines in order to permit a rotationally fixed connection to corresponding splines inside the hub of a propeller.

The invention also relates to a propeller including a hub with propeller blades secured to the hub, the hub being provided with an axial through-opening in which splines are arranged in order to permit a rotationally fixed connection between the propeller and a propeller shaft with corresponding splines.

The invention additionally relates to a propeller system including at least one propeller connected in a rotationally fixed manner to a propeller shaft, the propeller shaft having a portion provided with splines which cooperate with corresponding splines inside the hub of the propeller in order to obtain the rotationally fixed connection.

Still further, the invention relates to an adapter that enables a propeller system as described hereinabove regarding a propeller connected in a rotationally fixed manner to a propeller shaft by way of cooperating splines.

BACKGROUND OF INVENTION

Propellers of the abovementioned type, for example on boats, are driven by a drive motor. The torque delivered by the drive motor is transmitted to the propeller via a drive shaft leading from the motor, a transmission mechanism and a propeller shaft. Since the propeller is designed with a through-opening in the hub thereof, with splines arranged in the through-opening, and the propeller shaft is designed with corresponding splines, a rotationally fixed connection is obtained, when the two (propeller and propeller shaft) are joined together, so that the torque delivered by the drive motor is transmitted to the propeller.

When the propeller of a boat is caused to rotate with the aid of the drive motor, the propeller generates a compressive force which drives the boat forward or backward depending on the direction of rotation of the propeller. The compressive force gives rise to a reaction force which is transmitted to the propeller shaft via the propeller hub. The propeller shaft is therefore provided with a flange against which the hub bears in order to take up the compressive force when the propeller drives the boat forward, and an end nut against which the hub bears in order to take up the compressive force when the propeller drives the boat backward.

A problem with the abovementioned type of spline connection between the propeller hub and the propeller shaft is, however, that only the torque delivered by the drive motor can be transmitted via the spline connection. Consequently, the resulting compressive force is transmitted completely via the flange or end nut, which means that these have to be given a relatively robust and therefore bulky construction, particularly in the case of high-power motors. Another problem is that the propeller hub has to be made particularly robust, and therefore bulky, at those parts which are intended to bear against the flange or end nut. This is particularly problematic in what are known as twin-screw arrangements, that is to say two propellers rotating counter to one another on the same longitudinal geometric axis, where one propeller is connected to a propeller shaft extending through a bore in the second propeller's propeller shaft, and where a large number of components therefore have to be accommodated within a very limited space.

SUMMARY OF THE INVENTION

It is an objective of the present invention to provide a propeller shaft adapted to be connected to the output shaft of a drive motor, where the rotationally fixed connection between propeller and propeller shaft is arranged to at least partially take up the compressive force which is transmitted to the propeller shaft, via the propeller hub of the propeller.

The invention thus relates to a propeller shaft adapted to be connected to the output shaft of a drive motor, the propeller shaft having a portion provided with splines in order to permit a rotationally fixed connection with corresponding splines inside the hub of a propeller. The splines on the propeller shaft are in this case helical, with a predetermined oblique angle, and the axial compressive forces which are generated by the propeller are at least partially taken up by the splines. This means that the axial limit stops, namely the flange and the end nut, can have a simpler design.

A further objective of the present invention is to adapt the oblique angle so that the resultant between the tangential force component of the torque delivered by the drive motor and the propelling compressive force is taken up in a direction substantially at right angles to the splines. This means that the dimensions of the axial limit stops, namely the flange and the end nut, can be made smaller, and that the propeller shaft can have the optimum strength.

By virtue of the fact that the direction of the helical shape of the splines along the circumferential surface of the propeller shaft (from the rear as viewed in the direction of travel) is chosen or arranged to be counterclockwise. In this manner, with one propeller rotating counterclockwise and conversely one propeller rotating clockwise, the stresses on the axial limit stops, namely the flange and the end nut, are reduced. Consequently, the stresses on the support surfaces of the propeller hub bearing against the limit stops are also reduced.

It is a further object of the present invention to make available a propeller comprising a hub with propeller blades secured to the hub, which hub is provided with an axial through-opening in which splines are arranged in order to permit a rotationally fixed connection between the propeller and a propeller shaft with corresponding splines. The rotationally fixed connection is arranged to at least partially take up the compressive force which is transmitted to the propeller shaft, via the propeller hub, of the propeller.

Thus, the invention also relates to a propeller comprising a hub with propeller blades secured to the hub, which hub is provided with an axial through-opening in which splines are arranged in order to permit a rotationally fixed connection between the propeller and a propeller shaft with corresponding splines. The splines in the hub are in this case helical with a predetermined oblique angle, and the axial compressive forces which are generated by the propeller are at least partially taken up by the splines. This means that the support surfaces which are arranged on the hub of the propeller, and which are intended to bear against the flange and the end nut, can have a simpler design.

According to a preferred embodiment of the propeller according to the invention, the oblique angle is adapted such that the resultant between the tangential force component of the torque delivered by the drive motor and the propelling axial compressive force is taken up in a direction substantially at right angles to the splines. This means that the size of the support surfaces on the hub of the propeller can be reduced and that the hub can have the optimum strength.

By virtue of the fact that the direction of the helical shape of the splines in the propeller hub (from the rear as viewed in the direction of travel) is counterclockwise, with one propeller intended to rotate counterclockwise during travel in the direction of travel and conversely one propeller rotating clockwise, induced stresses on the axial limit stops, namely the flange and the end nut, are reduced (compared to conventionally configured arrangements) and, consequently, the stresses on the support surfaces of the propeller hub that bear against the limit stops are also reduced.

It is a further object of the present invention to make available a propeller system comprising (including, but not necessarily limited to) at least one propeller connected in a rotationally fixed manner to a propeller shaft, the propeller shaft having a portion provided with splines which cooperate with corresponding splines inside the hub of the propeller in order to obtain the rotationally fixed connection.

The rotationally fixed connection is arranged to at least partially take up the compressive force which is transmitted to the propeller shaft, via the propeller hub, of the propeller.

It is a further object of the present invention to make available an adapter to be included in a propeller system having a propeller coupled via the adapter in a rotationally fixed manner to a propeller shaft wherein the propeller shaft has at least a portion provided with splines which cooperate with corresponding splines inside a hub portion of the adapter in order to obtain the rotationally fixed connection. The splines on at least the propeller shaft are arranged at an oblique angle with respect to a longitudinal axis of the propeller shaft, and in a preferred embodiment are helically arranged.

Thus, the invention relates to a propulsion system comprising a propeller connected in a rotationally fixed manner to a propeller shaft, the propeller shaft having a portion provided with obliquely oriented splines which cooperate with corresponding splines inside the hub of the propeller, or a suitably arranged adapter, in order to obtain the rotationally fixed connection. Preferably, the splines on at least the propeller shaft are of helical configuration.

According to a preferred embodiment of the present invention, a first propeller is connected in a rotationally fixed manner to an outer propeller shaft. A second propeller is connected in a rotationally fixed manner to an inner propeller shaft extending through the outer propeller shaft. The propeller shafts are drivably connected to a drive motor. This creates the conditions for a higher degree of overall efficiency of the propeller system.

In one embodiment, the propeller(s) and shaft(s) are arranged behind the driving lower unit in a "pushing" configuration. In an alternative embodiment, the propeller(s) and shaft(s) are arranged ahead of the driving lower unit in a "pulling" configuration.

Further preferred embodiments and advantages of the invention will become evident from the attached patent claims and from the description given below.

BRIEF DESCRIPTION OF THE DRAWINGS

The invention will be described below on the basis of preferred illustrative embodiments and with reference to the accompanying FIGS., in which.

DETAILED DESCRIPTION OF PREFERRED EMBODIMENT(S)

Figure 1:
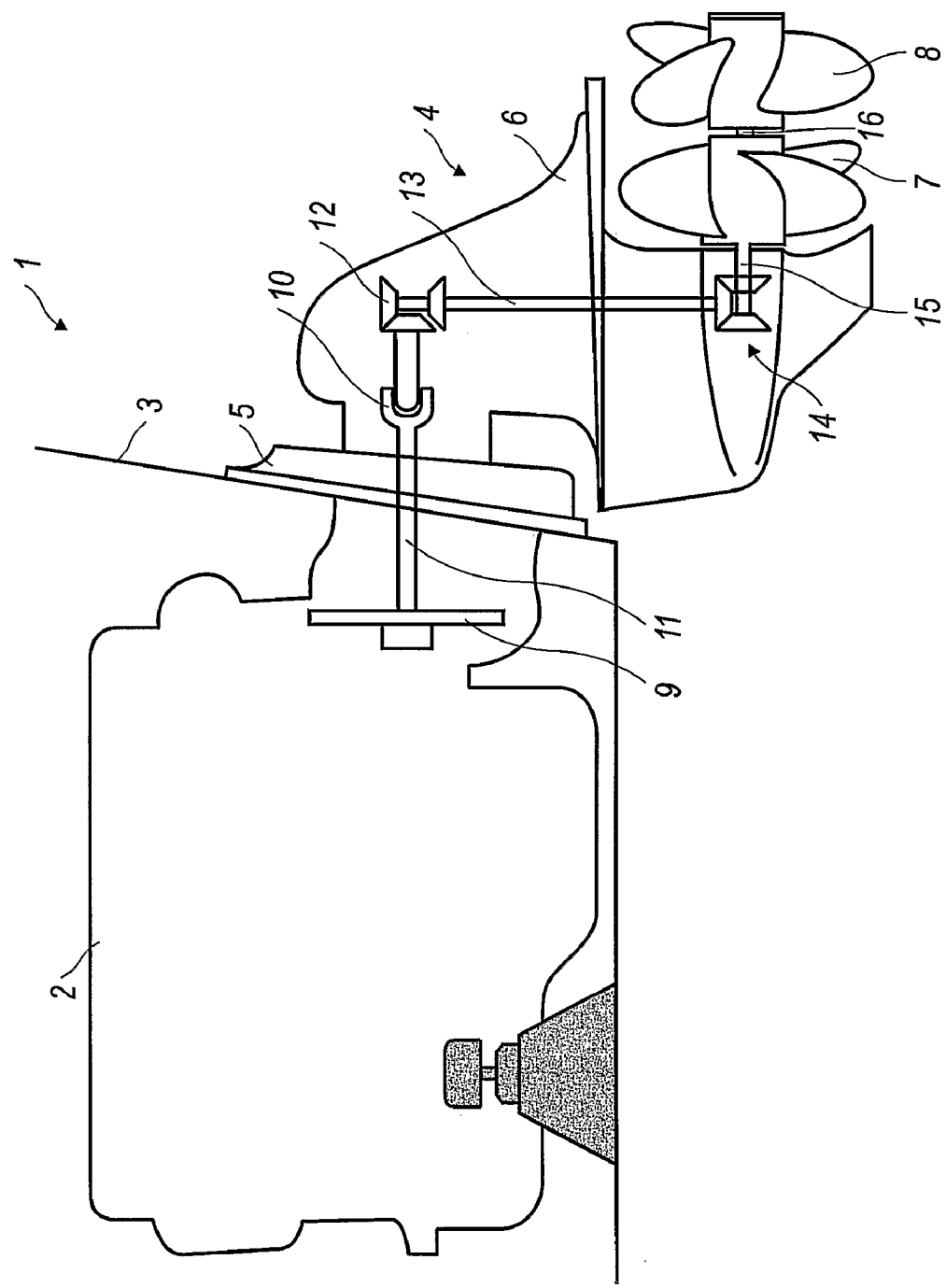
FIG. 1 is a diagrammatic representation of a drive unit configured according to the present invention attached to the stern of a boat, and with the propeller's arranged in a "pushing" configuration.

FIG. 1 is a diagrammatic representation, taken partly in cross section, of a drive unit 1 for boats with an inboard motor 2 and with a boat propeller unit 4 attached to the stern 3 of the boat. The boat propeller unit 4 includes a shield 5 which is screwed to the stern 3, and in which a propeller rig 6 is articulated in order to permit pivoting of the rig 6 on the one hand about a vertical shaft for steering the boat, and on the other hand about a horizontal shaft for trimming and opening the propeller rig 6.

The torque delivered by the drive motor 2 is transmitted to a first propeller 7 and to a second propeller 8 via a horizontal drive shaft 11 which is mounted in the shield 5 and which is connected in a rotationally fixed manner to the flywheel 9 of the motor and to the drive joints 10 of the propeller rig 6.

FIG. 1 also shows how the abovementioned drive joints 10 are connected in a rotationally fixed manner to an upper angle switch 12. The upper angle switch 12 is arranged in the propeller rig 6 and is connected in a rotationally fixed manner, by way of a vertical drive shaft 13, to a lower angle switch 14 for driving two substantially horizontal propeller shafts, namely an outer one 15 and an inner one 16, with which the first propeller 7 and the second propeller 8 are connected in a rotationally fixed manner.

Figure 2:
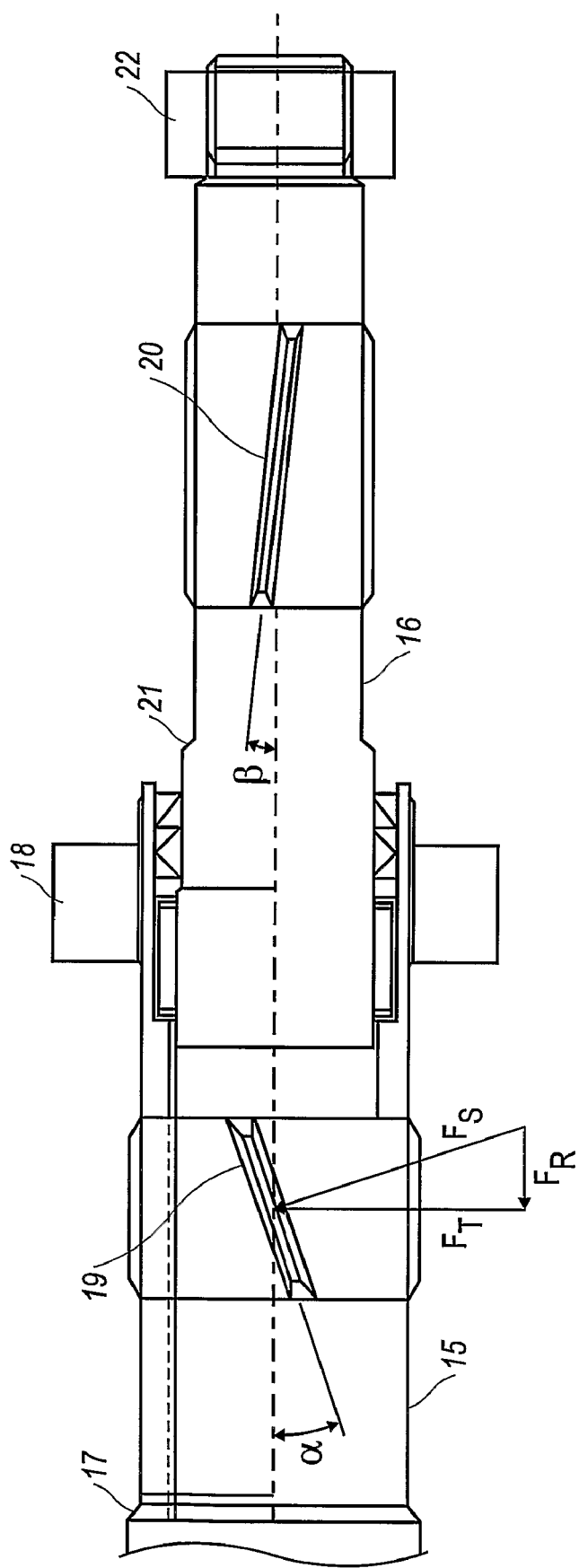
FIG. 2 is a diagrammatic side view, shown partly in cross section and partly in cutaway, of a pair of propeller shafts arranged for counter rotation, each with splines that are helical, with a predetermined oblique angle.

FIG. 2 shows, partially in cutaway and partially in cross section, an outer propeller shaft 15, and an inner propeller shaft 16 extending through the latter. The outer propeller shaft 15 is provided with a flange 17 against which a propeller hub positioned on the shaft 15 is intended to bear in order to take up some of the compressive force $F_R$ which arises when the propeller is driving a boat forward. When the propeller rotates in the opposite direction, that is to say to drive the boat in reverse, the compressive force $F_R$ is partially taken up instead by an end nut 18 arranged at the end portion of the propeller shaft 15.

By providing the propeller shaft 15 with splines 19 which are formed at the propeller shaft 15 with a predetermined oblique angle α, defined as the angle between the splines 19 and the longitudinal direction or axis of the propeller shaft 15, it is possible to transmit the tangential force component $F_T$ of the torque delivered by the drive motor 2 and also the reaction force generated by the compressive force $F_R$ of the propeller. The oblique angle α is determined after calculating the expected tangential force component $F_T$ and compressive force $F_R$ so that the force $F_s$ acting on the splines 19 is taken up substantially at right angles to these. In the example shown in FIG. 2, the splines 19 are shown for a propeller 7 rotating counterclockwise, as viewed from the rear in the direction of travel. This means that the flange 17 and the end nut 18 can have a simpler design and that the propeller shaft 15 can be made smaller while retaining its strength.

The inner propeller shaft 16 is also provided with splines 20 which are formed in the propeller shaft 16 with a predetermined oblique angle β, defined as the angle between the splines 20 and the longitudinal direction or axis of the propeller shaft 16. The difference is that the splines 20 are turned (as threads on a bolt or screw) in the opposite direction in relation to the above-described splines 19 because, in the example represented in FIG. 2, they are shown for a propeller 8 rotating clockwise, viewed from the rear in the direction of travel. The oblique angle is chosen in the same way as described above so that the force acting on the splines 20 is taken up substantially at right angles to the splines 20. This means that the flange 21 and the end nut 22 can have a simpler design and that the propeller shaft 16 can be made smaller, which is particularly advantageous as it extends through the outer propeller shaft 15.

The oblique angles α and β are determined taking into consideration the torque delivered by the drive motor 2, preferably at a motor speed corresponding to an expected cruising speed, and transmitted to each of the propellers 7, 8. Moreover, the configuration of the propellers 7, 8, for example their blade areas, blade pitch and direction of rotation, would be taken into consideration in the determination. By virtue of the fact that the direction of the helical shape of the splines 19,20 along the propeller shafts 15, 16, from the rear as viewed in the direction of travel, is chosen counterclockwise, with one propeller 7 rotating counterclockwise and conversely one propeller 8 rotating clockwise, it is possible to reduce the stresses on the axial limit stops 17, 18, 21,22 and, consequently, to also reduce the stresses on those support surfaces (not shown) of the hub 23,26 of the propellers 7,8 which bear against the limit stops.

There follows an example of the calculation of the oblique angles α, β for a typical diesel motor. In the example, a diesel motor delivers a torque of 560 Nm at cruising speed. With a total transmission of 1:1.78 between the output drive shaft 11 of the motor 2 and the propeller shafts 15, 16, the propeller shaft torque is 996 Nm, which, divided between the two propeller shafts 15, 16, gives 498 Nm per shaft. The splines 19 of the outer propeller shaft 15 are further assumed to be arranged on the radius 24 mm, which gives the tangential force component $F_T$=20750 N. The splines of the inner propeller shaft 16 are assumed to be arranged on the radius 13.5 mm, which gives the tangential force component $F_T$=36889 N. Finally, the propellers 7, 8 are assumed to give approximately 5500 N in axial compressive force $F_R$ at the cruising speed. To ensure that the force $F_S$ will act at right angles to the splines 19, 20 of the two propeller shafts 15, 16, the oblique angle α for the outer propeller shaft 15 must therefore be arctan (5500/20750) =14.8 degrees, and the oblique angle β for the inner propeller shaft 16 must therefore be arctan (5500/36889)=8.5 degrees.

Figure 3:
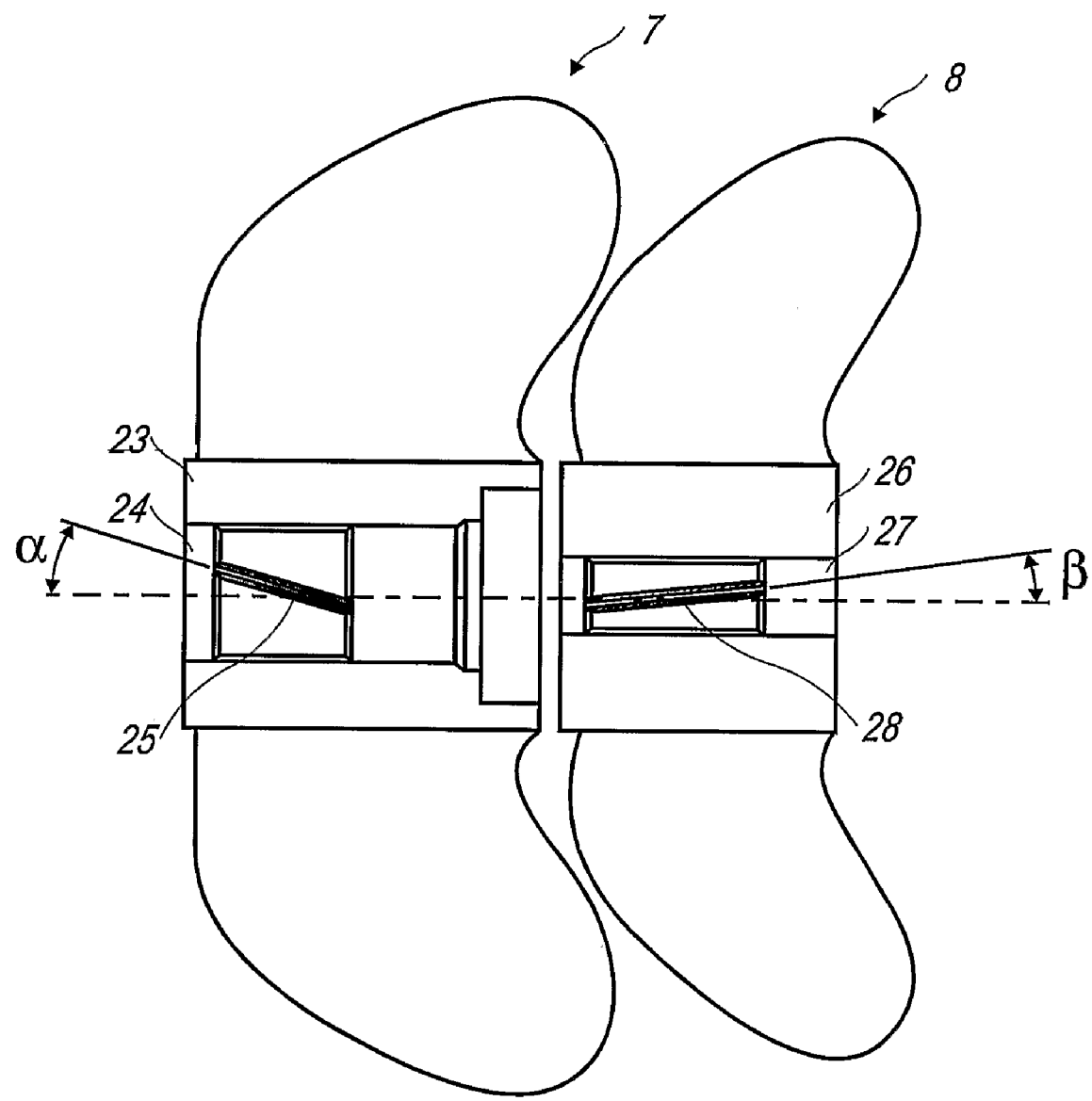
FIG. 3 is a diagrammatic side view, shown partly in cross section and partly in cutaway, of a pair of propellers arranged for counter rotation, each having splines in the through-opening of the respective hub, which splines are helical, with a predetermined oblique angle.

FIG. 3 shows the propellers 7, 8, partly in cutaway and partly in cross section. For the sake of clarity, only the propeller 7 is described in detail, because the design of the propeller 8 is principally the same. Extending through the hub 23 of the propeller 7 there is a through-opening 24 in which splines 25 are formed with the same oblique angle α as on the propeller shaft 15 in order to permit coupling of the two, with a rotationally fixed connection being obtained for transmitting the torque delivered by the drive motor. The oblique angle α is defined herein as the angle between the splines 25 and the axis of symmetry of the opening 24.

The propeller 8 is also designed with a hub 26, through which there extends a through-opening 27. Splines 28 with the oblique angle β are formed in the through-opening 27.

Figure 4:
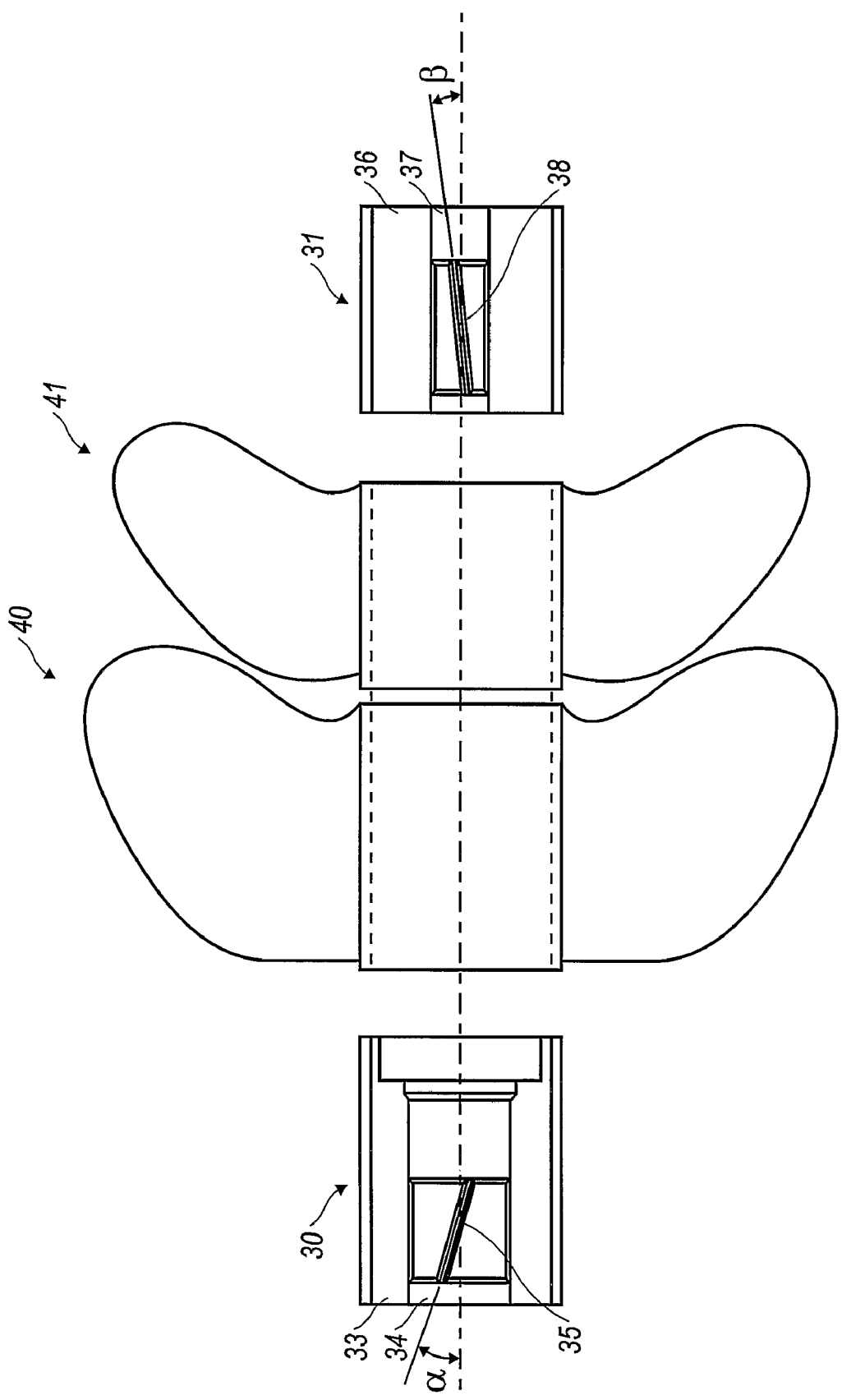
FIG. 4 is a diagrammatic side view, shown partly in cross section and partly in cutaway, of a pair of propellers arranged for counter rotation, together with respective adapters associated with each of the propellers for affecting the association of the propellers with propeller shafts adapted as depicted in FIG. 2.

FIG. 4 shows propellers 40, 41, partly in cutaway and partly in cross section, together with propeller adapters 30, 31. For the sake of clarity, only the propeller 40 and the associated adapter 30 are described in detail, because the design of the propeller 41 and its associated adapter 31 are principally the same. In this embodiment of the invention, the propellers 40, 41 are of traditional design wherein splines (or spline-receiving grooves, as the case may be) are oriented substantially parallel to a longitudinal axis of the propellers 40, 41. Byway of the adapters 30, 31, propellers 40, 41, which are of conventional design, are made compatible to specially configured propeller shafts 15, 16 as described hereinabove.

Extending through a hub 33 of the propeller adapter 30 is a through-opening 34 in which splines 35 (or spline receivers 35, as the case may be) are formed with the same oblique angle α as the spline configuration on the propeller shaft 15. This corresponding configuration between the two spline arrangements permits coupling of the adapter 30 to the propeller shaft, with a rotationally fixed connection being obtained for transmitting the torque delivered by the drive motor. The oblique angle α is defined here as the angle between the splines 35 and the axis of symmetry of the opening 34. In the illustrated embodiment, the exterior of the adapter 30 is provided with splines conventionally arranged for mating engagement with receiving grooves in a traditionally configured propeller. By conventional design, it is meant that this spline arrangement between the adapter 30 and the associated propeller shaft is oriented substantially parallel to a longitudinal axis of the propeller 40 and shaft.

The propeller adapter 31 is also designed with a hub 36, through which extends a through-opening 37. Splines 38 with the oblique angle β are formed in the through-opening 37. As described above, splines of conventional configuration are provided on an exterior surface of the adapter 31 for mating engagement with a similarly configured propeller hub.

The invention is not limited to the embodiments shown in the drawings and described above, and instead it can be freely varied while remaining within the scope of the patented claims. For example, embodiments of the present invention contemplate that the boat propeller unit can be equipped with a single propeller shaft, as well as a single associated propeller and adapter in corresponding configurations. Each case, that is individually considering a single propeller, a single propeller shaft and/or a single adapter having obliquely oriented splines in association therewith, is considered to constitute a protectable aspect of the present invention.

It should be further appreciated that splined connections have been described and claimed with respect to the presently disclosed invention(s). As will be appreciated by those persons skilled in the art, such splined connections are configured to prevent relative rotation between the so-connected components, and may take the form, among others, of abutting raised ridges, tabs, flanges and the like. Such splined connections may also assume a tongue-in-groove type configuration wherein one member of the connection comprises a projection and the corresponding member comprises a receiver for that projection. In this case, either the tongue or the groove may constitute the spline. What should be appreciated as being at least one objective with regard to the presently disclosed invention(s) is that these "splined" connective members are at least partially obliquely oriented with respect to a long axis of the propeller and shaft configuration with which they are, or will be related. It is because of this oblique orientation that forces are able to be taken up therein, thereby at least partially relieving the force or stress that would have been traditionally experienced on a conventionally configured receiving shoulder or end-nut from the propulsive force generated by a rotating propeller.

Figure 5:
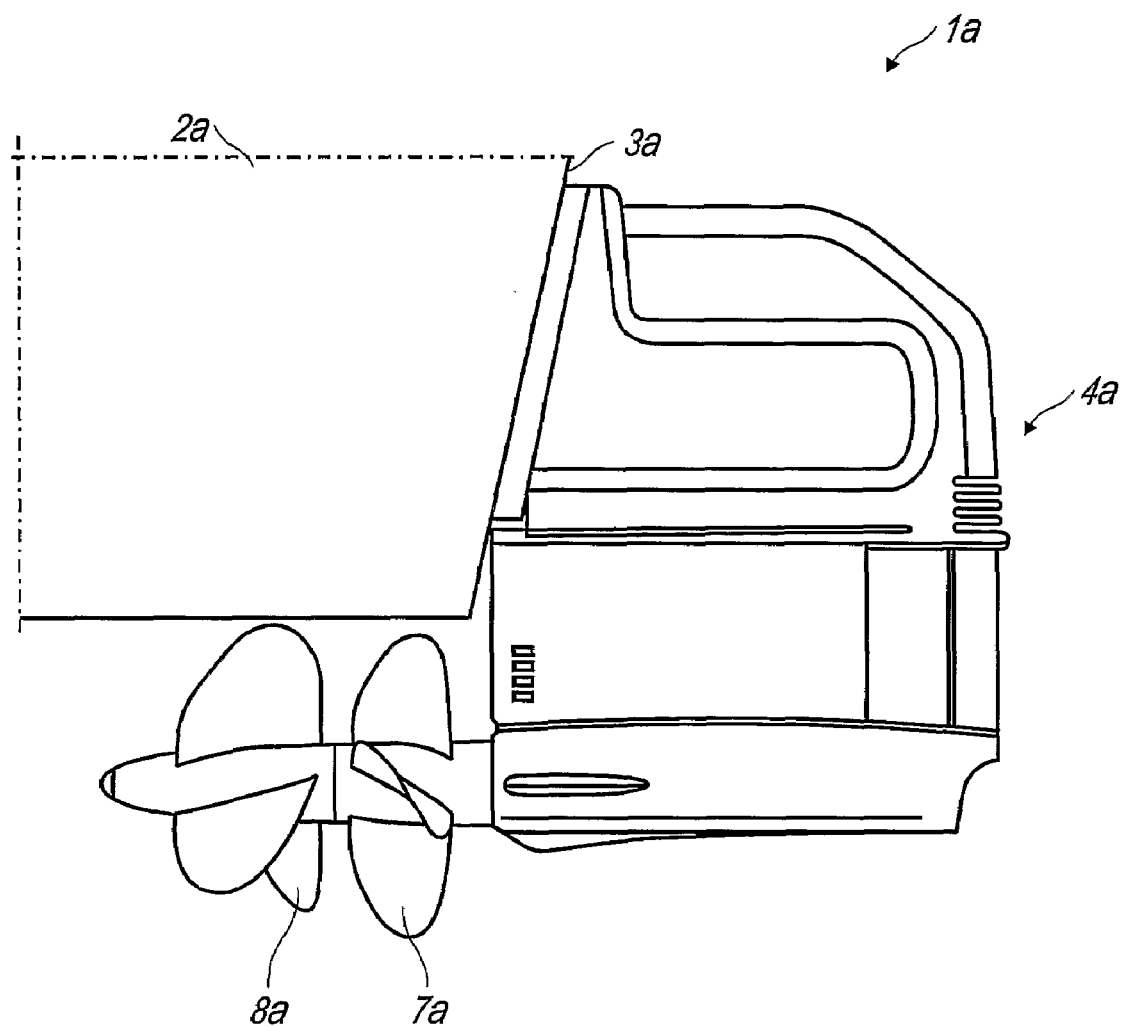
FIG. 5 is a diagrammatic representation, shown partly in cross section, of a drive unit configured according to the present invention attached to the stern of a boat with the propeller's arranged in a "pulling" configuration.

Still further, as shown in FIG. 1, the propellers 7, 8 are in a trailing position to the power unit thereby forming a propulsion system oriented in a "pushing" configuration. With respect to the present invention, it is also contemplated that the propellers may be arranged in a leading position with respect to the power unit, thereby forming a pulling configuration as shown in FIG. 5. Therein, the drive unit 1a of an inboard motor 2a is shown mounted in the stern 3a of a boat and connected to a boat propeller unit 4a. The two counter-rotating propellers 7a, 8a are shown in a leading or "pulling" configuration generally pointing in the direction of travel of the carrying boat. Such a pulling configuration is described in greater detail in International Patent Application PCT/SE01/00193, published as WO 01/56876 and designating the United States, together with the corresponding U.S. application Ser. No. 182667 filed 8 Nov. 2002, both of which are hereby expressly incorporated by reference, in their entireties for purposes of disclosure in the present application.

What is claimed is:

1. A propeller shaft arrangement adapted to be connected to an output shaft (11) of a drive motor (2) for causing propulsion of a carrying vehicle in a travel direction, the propeller shaft arrangement comprising:
a plurality of propeller shafts (15,16) having a common longitudinal axis, each of said plurality of propeller shafts (15,16) having at least one spline (19,20) positioned thereupon and oriented at an oblique angle ($\alpha$, $\beta$) with respect to the longitudinal axis, wherein said at least one spline (19, 20) on each of said propeller shafts (15, 16) is oriented at a different oblique angle ($\alpha$, $\beta$) with respect to the longitudinal axis of said propeller shafts (15, 16).

2. The propeller shaft arrangement as recited in claim 1, wherein each of said oblique angles ($\alpha$, $\beta$), with respect to the longitudinal axis of said propeller shafts (15, 16), is oriented such that a resultant force ($F_S$) between a tangential force component ($F_T$) of drive-motor-induced torque and a corresponding driving compressive force ($F_R$) is oriented at a substantially right angle to the respective receiving spline (19, 20) of said resultant force ($F_S$) when drive-motor power is applied.

3. The propeller shaft arrangement as recited in claim 1, wherein orientations of said oblique angles ($\alpha$, $\beta$), as measured with respect to the longitudinal axis of said propeller shafts (15, 16), are predetermined based on an expected cruising speed of a drive motor to be associated therewith on a carrying vehicle.

4. A propeller arrangement having a hub (23) with a through-opening (24) and blades connected thereto, the propeller arrangement being adapted to be connected, via a propeller shaft (15) to an output shaft (11) of a drive motor (2) for causing propulsion of a carrying vehicle in a travel direction, the propeller arrangement comprising:
a plurality of at least two propellers (7, 8) having a common longitudinal axis, and each of said at least two propellers (7, 8) adapted to achieve a rotationally fixed connection with a corresponding spline (25, 28) positioned thereupon and oriented at an oblique angle ($\alpha$, $\beta$) with respect to the longitudinal axis, wherein each of said at least one spline (25, 28) on each of said propellers (7, 8) is oriented at a different oblique angle ($\alpha$, $\beta$) with respect to the longitudinal axis of said propellers (7, 8).

5. The propeller arrangement as recited in claim 4, wherein each of said oblique angles ($\alpha$, $\beta$), with respect to the longitudinal axis of said propellers (7, 8), is oriented such that a resultant force ($F_S$) between a tangential force component ($F_T$) of drive-motor-induced torque and a corresponding driving compressive force ($F_R$) is oriented at a substantially right angle to the respective receiving spline (25, 28) of said resultant force ($F_S$) when drive-motor power is applied.

6. The propeller arrangement as recited in claim 4, wherein orientations of said oblique angles ($\alpha$, $\beta$), as measured with respect to the longitudinal axis of said propellers (7, 8), are predetermined based on an expected cruising speed of a drive motor to be associated therewith on a carrying vehicle.

7. An adaptive arrangement having through-openings (34, 37) in a hub (33) thereof and the adaptive arrangement being configured to be interstitially positioned between a propeller (7) and a propeller shaft (15) which is coupled to an output shaft (11) of a drive motor (2) for causing propulsion of a carrying vehicle in a travel direction, the adaptive arrangement comprising:
a plurality of adapters (30, 31), each having a through-opening (34, 37) and a common longitudinal axis (30), and each of said plurality of adapters (30, 31) having at least one spline (35, 38) positioned thereupon and oriented at an oblique angle (a, 13) with respect to the longitudinal axis; and
said splines (35, 38) adapted to achieve a rotationally fixed connection with a corresponding spline located on corresponding propeller shafts, and wherein said at least one spline (35, 38) on each of said adapters (30, 31) is oriented at a different oblique angle ($\alpha$, $\beta$) with respect to the longitudinal axis of said adapters (30, 31).

8. The adaptive arrangement as recited in claim 7, wherein each of said oblique angles ($\alpha$, $\beta$), with respect to the longitudinal axis of said adapters (30, 31), is oriented such that a resultant force ($F_S$) between a tangential force component ($F_T$) of drive-motor-induced torque and a corresponding driving compressive force ($F_R$) is oriented at a substantially right angle to the respective receiving spline (35, 38) of said resultant force ($F_S$) when drive-motor power is applied.

9. The adaptive arrangement as recited in claim 7, wherein orientations of said oblique angles ($\alpha$, $\beta$), as measured with respect to the longitudinal axis of said adapters (30, 31), are predetermined based on an expected cruising speed of a drive motor to be associated therewith on a carrying vehicle.

10. A multiple propeller shaft arrangement adapted to be connected to a drive motor (2) for causing propulsion of a carrying vehicle in a travel direction, the propeller shaft arrangement comprising:

a first propeller shaft (15) having at least a portion thereof provided with a spline (19) adapted to achieve a rotationally fixed connection with a corresponding spline located inside a hub of a corresponding propeller, said spline (19) being oriented at a first oblique angle (a) with respect to a longitudinal axis of said propeller shaft (15); and a second propeller shaft (16) having at least a portion thereof provided with a spline (20) adapted to achieve a rotationally fixed connection with a corresponding spline located inside a hub of a corresponding propeller, said spline (20) being oriented at a second oblique angle (a) with respect to a longitudinal axis of said propeller shaft (16), wherein the drive motor operates the second propeller shaft in counter rotation with respect to the first propeller shaft, and wherein the first spline oblique angle has a different direction than that of the angle of the second spline oblique angle.

11. A multiple propeller shaft arrangement as recited in claim 10, wherein said oblique angle ($\alpha$) is offset from parallel with said longitudinal axis of said propeller shaft (15) by at least 8.5 degrees.

* * * * *

INTER PARTES REEXAMINATION CERTIFICATE (1223rd)
United States Patent
Rydberg et al.

(10) Number: US 7,223,074 C1
(45) Certificate Issued: Jan. 15, 2016

(54) PROPELLER SHAFT ARRANGEMENT, PROPELLER ARRANGEMENT, ADAPTIVE ARRANGEMENT AND PROPULSION ARRANGEMENT

(75) Inventors: Anders Rydberg, Arboga (SE); Stefan Nilsson, Koping (SE)

(73) Assignee: AB VOLVO PENTA, Gothenburg (SE)

Reexamination Request:
No. 95/001,764, Sep. 15, 2011

Reexamination Certificate for:
Patent No.: 7,223,074
Issued: May 29, 2007
Appl. No.: 10/711,146
Filed: Aug. 27, 2004

Related U.S. Application Data

(63) Continuation of application No. PCT/SE03/00335, filed on Feb. 27, 2003, now abandoned.

(30) Foreign Application Priority Data

Feb. 27, 2002 (SE) ........................ 0200581

(51) Int. Cl.
*B63H 23/34* (2006.01)
*F16D 1/10* (2006.01)

(52) U.S. Cl.
CPC .......... *B63H 23/34* (2013.01); *F16D 2001/103* (2013.01)

(58) Field of Classification Search
None
See application file for complete search history.

(56) References Cited

To view the complete listing of prior art documents cited during the proceeding for Reexamination Control Number 95/001,764, please refer to the USPTO's public Patent Application Information Retrieval (PAIR) system under the Display References tab.

*Primary Examiner* — William Doerrler

(57) ABSTRACT

Apparatus for adapting a propeller system including a propeller shaft (15, 16) and a propeller (7, 8) adapted to be mounted on the propeller shaft (15, 16). The propeller system includes a propeller (7, 8) connected in a rotationally fixed manner to a propeller shaft (15, 16), the propeller shaft (15, 16) having a portion provided with splines (19, 20) which cooperate with corresponding splines (25, 28) inside the hub (23, 26) of the propeller (7, 8) in order to obtain the rotationally fixed connection, where the splines (19, 20) on the propeller shaft (15, 16) and in the hub (23, 26) of the propeller (7, 8) are helical, with a predetermined oblique angle ($\alpha$, $\beta$). The invention also relates to a propeller shaft (15, 16) and a propeller (7, 8) which are intended to be used in the propeller system.

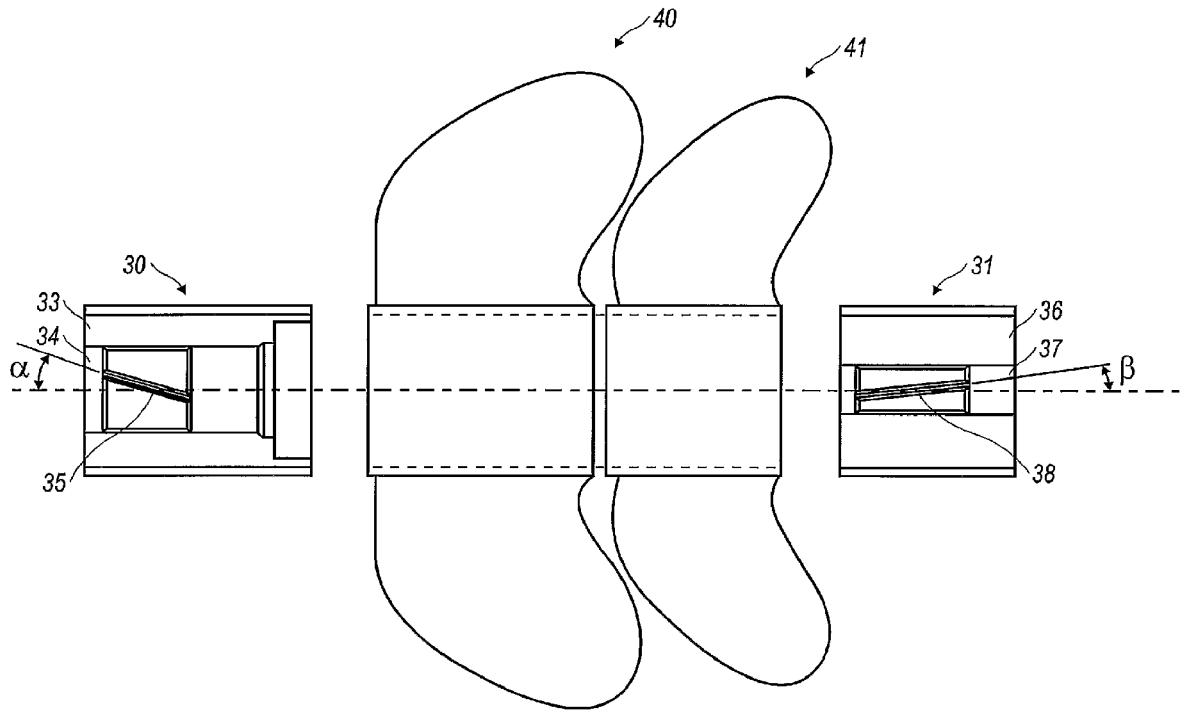

INTER PARTES REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-11 are determined to be patentable as amended.

New claim 12 is added and determined to be patentable.

1. A propeller shaft arrangement *comprising:*
   *a pair of counter rotating boat propeller shafts* (15,16) adapted to be connected *in a propeller system* to an output shaft (11) of a drive motor (2) *and by rotationally fixed helical spline connections to respective propellers* (7,8) *of a pair of counter rotating boat propellers* (7,8), *the drive motor outputting known drive-motor-induced torque at cruising speed to each of the pair of propeller shafts* (15,16) *and thereby causing known driving compressive forces* ($F_R$) *on the respective propeller shafts* (15,16) *by the propellers* (7,8) for causing propulsion of a carrying [vehicle] *boat* in a travel direction[, the propeller shaft arrangement comprising: a plurality];
   *the pair* of *counter rotating boat* propeller shafts (15,16) having a common longitudinal axis, each of said [plurality of] propeller shafts (15,16) having *a known radius and* at least one spline (19,20) positioned thereupon and oriented at [an] *a predetermined* oblique angle ($\alpha,\beta$) with respect to the longitudinal axis, wherein said at least one spline (19,20) on each of said propeller shafts (15,16) is oriented at a different *predetermined* oblique angle ($\alpha,\beta$) with respect to the longitudinal axis of said propeller shafts (15,16); and
   *each of said predetermined oblique angles* ($\alpha,\beta$) *on respective counter rotating boat shafts* (15,16) *of known radius is oriented with respect to the longitudinal axis of said propeller shafts* (15,16) *such that the force acting on the spline* (19,20) *is a resultant force* ($F_S$) *between a tangential force component* ($F_T$) *of the known drive-motor-induced torque and the corresponding known driving compressive force* ($F_R$) *and the resultant force* ($F_S$) *is oriented at a substantially right angle to the respective receiving spline* (19,20).

2. The propeller shaft arrangement as recited in claim 1, wherein each of said *predetermined* oblique angles ($\alpha,\beta$) [, with respect to the longitudinal axis of said propeller shafts (15,16),] *on respective counter rotating boat shafts* (15,16) is oriented *with respect to the longitudinal axis of said propeller shafts* (15,16) such that [a] *the* resultant force ($F_S$) between [a] *the* tangential force component ($F_T$) of drive-motor-induced torque and [a] *the* corresponding driving compressive force ($F_R$) is oriented at a substantially right angle to the respective receiving spline (19,20) of said resultant force ($F_S$) when *the* drive-motor [power]-*induced torque* is [applied] *divided evenly between the counter rotating boat shafts* (15,16).

3. The propeller shaft arrangement as recited in claim 1, wherein [orientations of said oblique angles ($\alpha,\beta$), as measured with respect to the longitudinal axis of said propeller shafts (15,16), are predetermined based on an expected cruising speed of a drive motor to be associated therewith on a carrying vehicle] *each of said predetermined oblique angles* ($\alpha,\beta$) *on respective counter rotating boat shafts* (15,16) *is oriented with respect to the longitudinal axis of said propeller shafts* (15,16) *such that the resultant force* ($F_S$) *between the tangential force component* ($F_T$) *of drive-motor-induced torque and the corresponding driving compressive force* ($F_R$) *is oriented at a substantially right angle to the respective receiving spline* (19,20) *of said resultant force* ($F_S$) *when equal amounts of driving compressive force* ($F_R$) *are received on each counter rotating boat shaft* (15,16).

4. A propeller arrangement [having a hub (23) with a through-opening (24) and blades connected thereto, the propeller arrangement being] *comprising:*
   a pair of *counter rotating boat* propellers (7,8) adapted to be connected [, via a propeller shaft (15)] *in a propeller system* to an output shaft (11) of a drive motor (2) *and by rotationally fixed helical spline connections to respective shafts* (15,16) *of a pair of counter rotating boat propeller shafts* (15,16), *the drive motor outputting known drive-motor-induced torque at cruising speed to each of the propellers* (7,8) *via the propeller shafts* (15,16) *and thereby causing known driving compressive forces* ($F_R$) *on the respective propellers* (7,8) *by the propeller shafts* (15,16) for causing propulsion of a carrying [vehicle] *boat* in a travel direction[, the propeller arrangement comprising: a plurality];
   each propeller (7,8) *of the pair* of [at least two] *counter rotating boat* propellers (7,8) having *a hub* (23,26) *with a through-opening* (24,27) *of known radius about* a common longitudinal axis [and] *of the propellers* (7,8), -each *through-opening* (24,27) of said [at least two] propellers (7,8) [adapted to achieve a rotationally fixed connection with a corresponding] *having a* spline (25,28) positioned thereupon and oriented at [an] *a predetermined* oblique angle ($\alpha,\beta$) with respect to the longitudinal axis, wherein each [of said at least one] spline (25,28) on each of said propellers (7,8) is oriented at a different oblique angle ($\alpha,\beta$) with respect to the longitudinal axis of said propellers (7,8); and
   *each of said predetermined oblique angles* ($\alpha,\beta$) *on respective through-openings* (24,27) *of known radius is oriented with respect to the longitudinal axis of said propellers* (7,8) *such that the force acting on the spline* (25,28) *is a resultant force* ($F_S$) *between a tangential force component* ($F_T$) *of the known drive-motor-induced torque and the corresponding known driving compressive force* ($F_R$) *and the resultant force* ($F_S$) *is oriented at a substantially right angle to the respective receiving spline* (25,28).

5. The propeller arrangement as recited in claim 4, wherein each of said *predetermined* oblique angles ($\alpha,\beta$) [, with respect to the longitudinal axis of said propellers (7,8),] *on respective through-openings* (24) is oriented *with respect to the longitudinal axis of said propellers* (7,8) such that [a] *the* resultant force ($F_S$) between [a] *the* tangential force component ($F_T$) of drive-motor-induced torque and [a] *the* corresponding driving compressive force ($F_R$) is oriented at a substantially right angle to the respective receiving spline (25,28) of said resultant force ($F_S$) when *the* drive-motor [power is applied] *-induced torque is divided evenly between the counter rotating boat propellers* (7,8).

6. The propeller arrangement as recited in claim 4, wherein [orientations of said oblique angles ($\alpha$, $\beta$), as measured with respect to the longitudinal axis of said propellers (7,8), are predetermined based on an expected cruising speed of a drive motor to be associated therewith on a carrying vehicle] *each of said predetermined oblique angles* ($\alpha,\beta$) *on respective* through-openings (24) is oriented with respect to the longitudinal axis of said propellers (7,8) such that the resultant force ($F_S$) between the tangential force component ($F_T$) of drive-motor-induced torque and the corresponding driving compressive force ($F_R$) is oriented at a substantially right angle to the respective receiving spline (25,28) of said resultant force ($F_S$) when equal amounts of driving compressive force ($F_R$) are received on each counter rotating boat propeller (7,8).

7. An adaptive arrangement [having through-openings (34, 37) in a hub (33) thereof and the adaptive arrangement being configured] *comprising:* a pair of adapters (30,31), each adapted to be: (i) interstitially positioned between [a propeller] *one of a pair of counter rotating boat propellers* (7,8) and [a] *one of a pair of counter rotating boat* propeller [shaft] *shafts* (15,16) [which is coupled], *(ii) connected in a propeller system* to an output shaft (11) of a drive motor (2) *and, (iii) connected by rotationally fixed helical spline connections to respective shafts (15,16) of the pair of counter rotating boat propeller shafts (15,16), the drive motor outputting known drive-motor-induced torque at cruising speed to each of the propellers (7,8) via the propeller shafts (15,16) and thereby causing known driving compressive forces ($F_R$) on the respective adapters (30,31) by the propeller shafts (15,16)* for causing propulsion of a carrying [vehicle] *boat* in a travel direction[, the adaptive arrangement comprising: a plurality];

each adapter *of the pair* of adapters (30,31)[, each] having a hub (33,36) with a through-opening (34,37) [and] *of* known radius about a common longitudinal axis [(30) and] *of the adapters (30,31)* each *through-opening (34, 37)* of said [plurality] *pair of* adapters (30,31) having at least one spline (35,38) positioned thereupon and oriented at [an] *a predetermined* oblique angle ([a, 13]α, β) with respect to the longitudinal axis; [and]

each of said splines (35,38) [adapted to achieve a rotationally fixed connection with a corresponding spline located on corresponding propeller shafts, and wherein said at least one spline (35,38) on each of said adapters (30,31)] is oriented at a different oblique angle (α,β) with respect to the longitudinal axis of said adapters (30,31); *and*

*each of said predetermined oblique angles (α,β) on respective through-openings (34,37) of known radius is oriented with respect to the longitudinal axis of said adapters (30,31) such that the force acting on the spline (35, 38) is a resultant force ($F_S$) between a tangential force component ($F_T$) of the known drive-motor-induced torque and the corresponding known driving compressive force ($F_R$) and the resultant force ($F_S$) is oriented at a substantially right angle to the respective receiving spline (35,38).*

8. The adaptive arrangement as recited in claim 7, wherein each of said *predetermined* oblique angles (α,β) [, with respect to the longitudinal axis of said adapters (30,31),] *on respective through-openings (34,37)* is oriented *with respect to the longitudinal axis of said adapters (30,31) such that* [a] *the* resultant force ($F_S$) between [a] *the* tangential force component ($F_T$) of drive-motor-induced torque and [a] *the* corresponding driving compressive force ($F_R$) is oriented at a substantially right angle to the respective receiving spline (35,38) of said resultant force ($F_S$) when *the* drive-motor [power is applied] *-induced torque is divided evenly between the counter rotating boat shafts (15,16)*.

9. The adaptive arrangement as recited in claim 7, wherein [orientations of said oblique angles (α,β), as measured with respect to the longitudinal axis of said adapters (30,31), are predetermined based on an expected cruising speed of a drive motor to be associated therewith on a carrying vehicle] *each of said predetermined oblique angles (α,β) on respective through-openings (34,37) is oriented with respect to the common longitudinal axis of said adapters (30,31) such that the resultant force ($F_S$) between the tangential force component ($F_T$) of drive-motor-induced torque and the corresponding driving compressive force ($F_R$) is oriented at a substantially right angle to the respective receiving spline (35,38) of said resultant force ($F_S$) when equal amounts of driving compressive force ($F_R$) are received on each adapter (30,31)*.

10. A multiple propeller shaft arrangement *comprising:* a pair of counter rotating boat propeller shafts (15,16) adapted to be connected *in a propeller system* to an output shaft (11) of a drive motor (2) *and by rotationally fixed helical spline connections to respective propellers (7,8) of a pair of counter rotating boat propellers (7,8), the drive motor outputting known drive-motor-induced torque at cruising speed to each of the pair of propeller shafts (15,16) and thereby causing known driving compressive forces ($F_R$) on the respective propeller shafts (15,16) by the propellers (7,8)* for causing propulsion of a carrying [vehicle] *boat* in a travel direction[, the propeller shaft arrangement comprising:];

a first propeller shaft (15) [having] *of the pair of counter rotating boat propeller shafts (15,16) having known radius and* at least a portion thereof provided with a spline (19) adapted to achieve a rotationally fixed connection with a corresponding spline located inside a hub of a corresponding propeller, said spline (19) being oriented at a first *predetermined* oblique angle ([a]α) with respect to a longitudinal axis of said propeller shaft (15);[and]

a second propeller shaft (16) [having] *of the pair of counter rotating boat propeller shafts (15,16) having known radius and* at least a portion thereof provided with a spline (20) adapted to achieve a rotationally fixed connection with a corresponding spline located inside a hub of a corresponding propeller, said spline (20) being oriented at a second *predetermined* oblique angle ([a]β) with respect to a longitudinal axis of said propeller shaft (16), wherein the drive motor operates the second propeller shaft in counter rotation with respect to the first propeller shaft, and wherein the first spline oblique angle has a different direction than that of the angle of the second spline oblique angle; *and*

*each of said predetermined oblique angles (α,β) on respective counter rotating boat shafts (15,16) of known radius is oriented with respect to the longitudinal axis of said propeller shafts (15,16) such that the force acting on the spline (19,20) is a resultant force ($F_S$) between a tangential force component ($F_T$) of the known drive-motor-induced torque and the corresponding known driving compressive force ($F_R$) and the resultant force ($F_S$) is oriented at a substantially right angle to the respective receiving spline (19,20)*.

11. [A] *The* multiple propeller shaft arrangement as recited in claim 10, wherein said oblique angle (α) is offset from parallel with said longitudinal axis of said propeller shaft (15) by at least 8.5 degrees.

12. A boat propeller and shaft arrangement *comprising:* a pair of counter rotating boat propeller shafts (15,16) connected *in a propeller system* to an output shaft (11) of a drive motor (2) *and by rotationally fixed helical spline connections to respective propellers (7,8) of a pair of counter rotating boat propellers (7,8), the drive motor* outputting known drive-motor-induced torque at cruising speed to each of the pair of propeller shafts (15,16) and thereby causing known driving compressive forces ($F_R$) on the respective propeller shafts (15,16) by the propellers (7,8) and thereby causing propulsion of a carrying boat in a travel direction;

the pair of counter rotating boat propeller shafts (15,16) having a common longitudinal axis, each of said propeller shafts (15,16) having a known radius and at least one spline (19,20) positioned thereupon and oriented at a predetermined oblique angle ($\alpha, \beta$) with respect to the longitudinal axis, wherein said at least one spline (19, 20) on each of said propeller shafts (15,16) is oriented at a different magnitude predetermined oblique angle ($\alpha, \beta$) with respect to the longitudinal axis;

each of said predetermined oblique angles ($\alpha, \beta$) on respective counter rotating boat shafts (15,16) of known radius is oriented with respect to the longitudinal axis such that the force acting on the spline (19,20) is a resultant force ($F_S$) between a tangential force component ($F_T$) of the known drive-motor-induced torque and the corresponding known driving compressive force ($F_R$) and the resultant force ($F_S$) is oriented at substantially right angle to the respective receiving spline (19,20);

each propeller (7,8) of the pair of counter rotating boat propellers (7,8) having a hub (23) with a through-opening (24) of known radius about the common longitudinal axis of the propeller shafts (15,16), each through-opening (24) of said propellers (7,8) having a spline (25,28) positioned thereupon and oriented at a predetermined oblique angle ($\alpha, \beta$) with respect to the longitudinal axis, wherein each spline (25,28) on each of said propellers (7,8) is oriented at a different oblique angle ($\alpha, \beta$) with respect to the longitudinal axis; and each of said predetermined oblique angles ($\alpha, \beta$) on respective through-openings (24) of known radius is oriented with respect to the longitudinal axis such that the force acting on the spline (25, 28) is a resultant force ($F_S$) between a tangential force component ($F_T$) of the known drive-motor-induced torque and the corresponding known driving compressive force ($F_R$) and the resultant force ($F_S$) is oriented at a substantially right angle to the respective receiving spline (25,28).

* * * * *